United States Patent
Pasolini et al.

(10) Patent No.: US 7,409,291 B2
(45) Date of Patent: Aug. 5, 2008

(54) DEVICE FOR AUTOMATIC DETECTION OF STATES OF MOTION AND REST, AND PORTABLE ELECTRONIC APPARATUS INCORPORATING IT

(75) Inventors: Fabio Pasolini, S. Martino Siccomario (IT); Ernesto Lasalandra, S. Donato Milanese (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 734 days.

(21) Appl. No.: 10/789,240

(22) Filed: Feb. 26, 2004

(65) Prior Publication Data

US 2004/0172167 A1  Sep. 2, 2004

(51) Int. Cl.
*G01C 21/00* (2006.01)
(52) U.S. Cl. .................. 701/220; 700/245; 74/5 R
(58) Field of Classification Search ............. 700/245, 700/258, 108, 67; 701/220; 74/5 R, 5.34, 74/5.46
See application file for complete search history.

(56) References Cited

U.S. PATENT DOCUMENTS

| | | | | |
|---|---|---|---|---|
| 3,490,719 A | * | 1/1970 | Volpe et al. ................. 244/169 |
| 4,823,626 A | * | 4/1989 | Hartmann et al. ............. 74/5.34 |
| 5,788,273 A | * | 8/1998 | Jeenicke et al. ............. 280/735 |
| 6,320,822 B1 | * | 11/2001 | Okeya et al. ................. 368/66 |
| 6,463,347 B1 | | 10/2002 | Nevruz et al. |
| 6,463,357 B1 | * | 10/2002 | An et al. ..................... 700/245 |
| 6,512,310 B1 | * | 1/2003 | Ohnishi ...................... 307/121 |
| 6,738,214 B2 | * | 5/2004 | Ishiyama et al. .............. 360/75 |
| 6,858,810 B2 | * | 2/2005 | Zerbini et al. ............ 200/61.08 |
| 2002/0033047 A1 | * | 3/2002 | Oguchi et al. ............ 73/514.16 |

* cited by examiner

*Primary Examiner*—Khoi H. Tran
*Assistant Examiner*—Marie A Weiskopf
(74) *Attorney, Agent, or Firm*—Lisa K. Jorgenson; Robert Iannucci; Seed IP Law Group PLLC

(57) ABSTRACT

A device for automatic detection of states of motion and rest includes at least one inertial sensor, having at least one preferential detection axis, and a converter, which is coupled to the inertial sensor and supplies a first signal correlated to forces acting on the first inertial sensor according to the preferential detection axis; the device further includes at least one processing stage for processing the first signal, which supplies a second signal correlated to a dynamic component of the first signal, and at least one threshold comparator, which supplies a pulse when the second signal exceeds a pre-determined threshold.

28 Claims, 2 Drawing Sheets

DEVICE FOR AUTOMATIC DETECTION OF STATES OF MOTION AND REST, AND PORTABLE ELECTRONIC APPARATUS INCORPORATING IT

BACKGROUND OF THE INVENTION

1. Field of the Invention

The present invention relates to a device for automatic detection of states of motion and rest and to a portable electronic apparatus incorporating it.

2. Description of the Related Art

As is known, reduction of power consumption is one of the main objectives in any sector of modern microelectronics. In some fields, however, power consumption has an even determining importance in the evaluation the quality of a product. Many widely used electronic devices, in fact, are provided with a stand-alone battery supply and are normally disconnected from the mains supply; this is, for example, the case of cell phones and cordless phones, of palm-top computers and radio frequency pointer devices for computers (mouses and trackballs). It is clear that the reduction both of supply voltages and of currents advantageously involves an increase in the autonomy of the device and hence a greater convenience of use.

Furthermore, frequently the cited above devices are effectively used just for brief periods, whereas for most of the time in which they are on they remain inactive. Consider, for example, the ratio between the duration of a call from a cell phone and the average time between two successive calls. It is clear that, for almost the entire period of operation, the cell phone remains inactive, but is in any case supplied and thus absorbs a certain power. In effect, the autonomy of the device is heavily limited.

Some devices, after a pre-determined interval of inactivity, can be automatically set in a wait state (stand-by), in which all the functions not immediately necessary are deactivated; for example, in a cell phone it is possible to turn off the screen and all the circuitry that is not involved in identifying an incoming call.

To reactivate the devices from stand-by, it is advantageous to exploit a signal linked to an event (such as, for example, reception of a call signal, in the case of cell phones). However, since it is not always possible to associate a signal to an event (for example, in the case where it is the user who wants to make a call), normally a reactivation key is provided, that the user can press for bringing back the device into a normal operative state.

In this case, however, one drawback lies in that the device is not immediately ready for use: the user must in fact pick up the device, press the reactivation key and wait for the extinction of a transient in which the functions previously deactivated are restored. Although this transient is relatively brief (at the most in the region of one second), it is not however negligible and in some cases can render the device altogether inefficient. For example, in a radio frequency mouse, the restore time would be so long that the advantage of having low consumption in stand-by would be basically nullified by the lower efficiency of use.

It would, instead, be desirable to have available a device incorporated in an apparatus that is able to generate automatically a reactivation signal when the apparatus is to be used.

BRIEF SUMMARY OF THE INVENTION

One embodiment of the present invention provides a device and an apparatus that enables the problem described above to be solved.

One embodiment of the present invention is a device for automatic detection of states of motion and rest. The device includes an inertial sensor having a preferential detection axis and a converter coupled to the inertial sensor and supplying a first signal correlated to forces acting on the first inertial sensor according to the preferential detection axis. The device also includes a processing stage structured to process the first signal and supply a second signal correlated to a dynamic component of the first signal; and a threshold comparator supplying a pulse when the second signal exceeds a pre-determined threshold.

BRIEF DESCRIPTION OF THE DRAWINGS

For a better understanding of the invention, an embodiment thereof is now described, purely by way of non-limiting example and with reference to the attached drawings, in which.

DETAILED DESCRIPTION OF THE INVENTION

Figure 1:
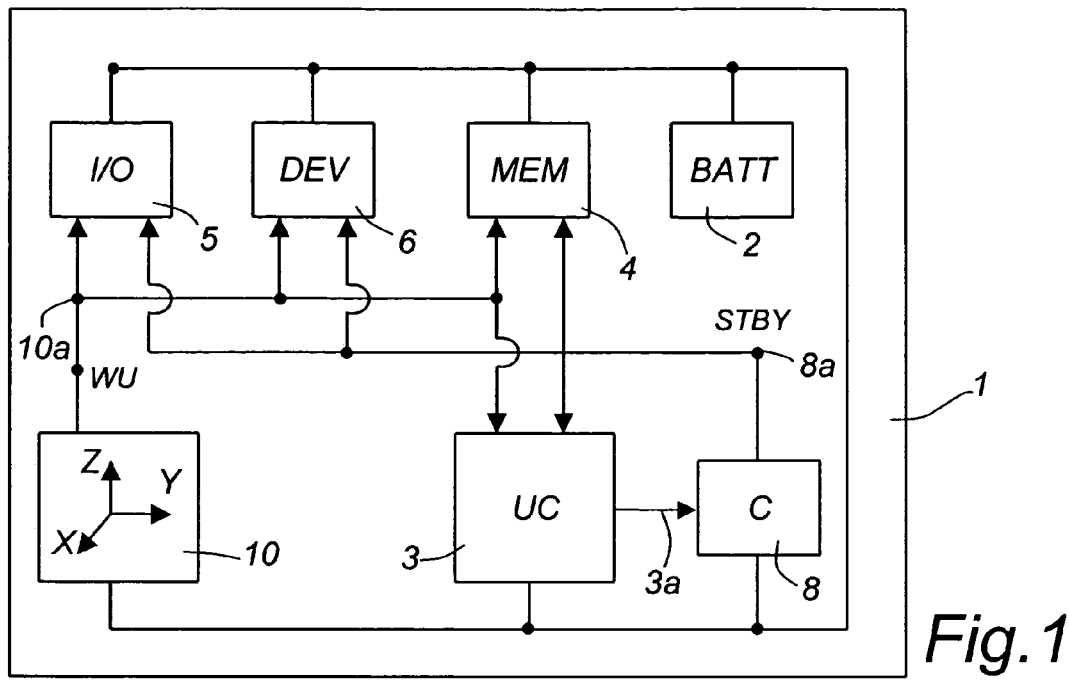
FIG. 1 illustrates a simplified block diagram of an apparatus incorporating a device made according to the present invention.

With reference to FIG. 1, designated, as a whole, by the reference number 1 is a portable electronic apparatus, which, in the example illustrated herein, is a palm-top computer; this must not, however, be considered in any way limiting, in so far as the apparatus 1 could also be of a different type. The apparatus 1 comprises at least one battery 2, a control unit 3, a memory 4, an input/output (I/O) unit 5 (for example an infrared serial port), a screen 6, a counter 8 and an activation device 10.

An output 2a of the battery 2, which supplies a supply voltage $V_{DD}$, is connected to respective supply inputs of the control unit 3, the memory 4, the I/O unit 5, the screen 6, the counter 8 and the activation device 10.

Furthermore, the control unit 3, the memory 4, the I/O unit 5 and the screen 6 have: respective stand-by inputs connected to an output 8a of the counter 8, which supplies stand-by pulses STBY; and respective activation inputs, connected to an output 10a of the activation device 10, which supplies activation pulses WU ("Wake-Up"). Furthermore, the counter 8 has a counting input connected to an output 3a of the control unit 3, which supplies a counting signal CT. In the presence of a first value of the counting signal CT, the counter 8 is disabled; when the counting signal CT switches from the first value to a second value, the counter 8 is reset and then incremented at each clock cycle. If the counter 8 reaches a pre-determined threshold counting value, a stand-by pulse STBY is generated.

During normal operation of the apparatus 1 (active state), the control unit 3 maintains the counting signal CT at the first value, disabling the counter 8. When, instead, the control unit 3 recognizes a condition in which the apparatus 1 is turned on, but is not used (for example, when the control unit 3 must execute only wait cycles), the counting signal is set at the second value, and the counter 8 is thus activated. After a pre-determined period of inactivity, the counter 8 reaches the threshold counting value and supplies at output a stand-by pulse STBY; in this way, the control unit 3, the screen 6, the I/O unit 5 and the memory 4 are set in a stand-by state, i.e., in an inoperative mode in which power consumption is minimized.

The activation device 10, the structure of which will be described in detail hereinafter, detects the accelerations to which the apparatus 1 is subjected, preferably along a first axis X, a second axis Y and a third axis Z orthogonal to one another and fixed to the apparatus 1. More precisely, the activation device 10 detects both the static accelerations (due to constant forces, like the force of gravity) and dynamic accelerations (due to non-constant forces) to which the apparatus 1 is subjected.

When the apparatus 1 is not used, it usually remains substantially immobile or in any case subjected to forces of negligible intensity, for example because it is resting on a shelf. As has been mentioned previously, after a pre-determined time interval, the apparatus 1 goes into a stand-by state. In these conditions, the activation device 10 detects dynamic accelerations which are practically zero and maintains its output 10a constant at a resting logic value; the apparatus 1 thus remains in stand-by.

When the dynamic accelerations directed along at least one of the three axes X, Y, Z exceed a pre-determined threshold, the activation device 10 generates an activation pulse WU thus bringing its output 10a to an activation logic value. In the presence of an activation pulse WU, any possible standby pulses STBY are ignored, and the control unit 3, the screen 6, the I/O unit 5 and the memory 4 are set in the active state. The activation pulse WU terminates when all the dynamic accelerations along the first axis X, the second axis Y and the third axis Z return below the pre-determined threshold.

The activation device 10 is based upon capacitive-unbalance linear inertial sensors, made using MEMS (Micro-Electro-Mechanical Systems) technology. For greater clarity, FIG. 2 illustrates a first inertial sensor 20, having a preferential detection axis parallel to the first axis X.

Figure 2:
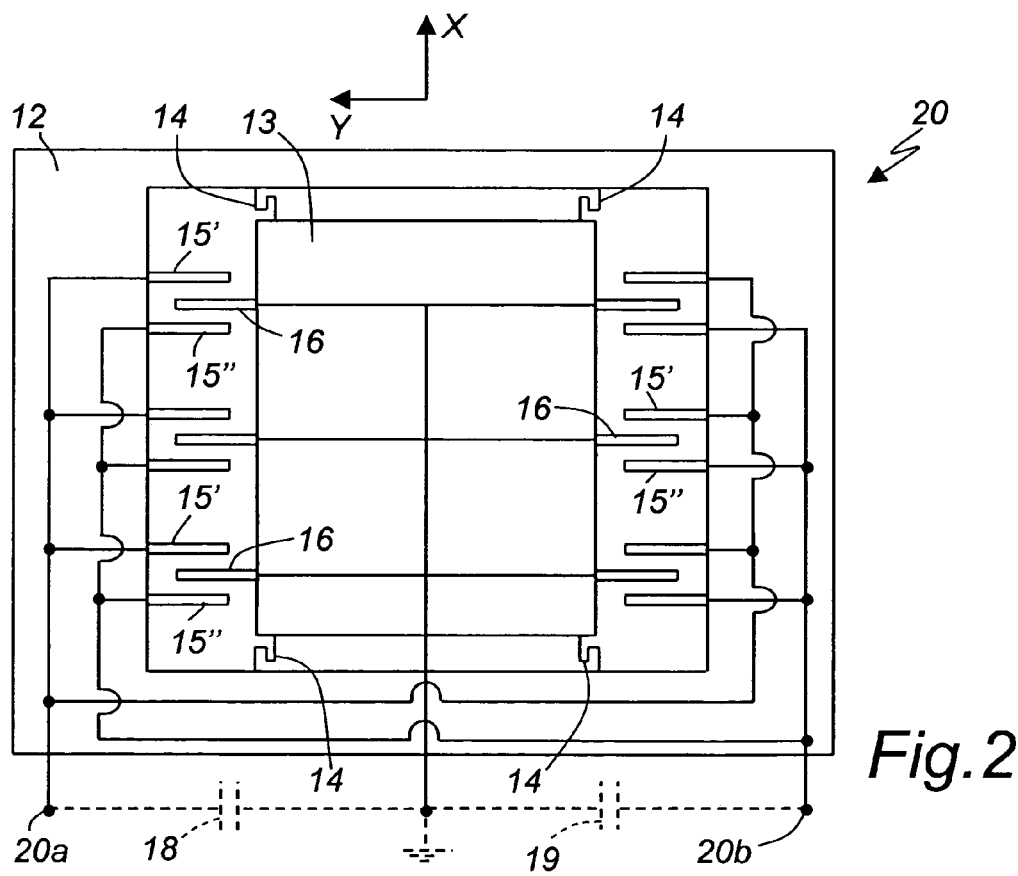
FIG. 2 illustrates a more detailed circuit block diagram of the device according to the present invention.

In detail, the first inertial sensor 20 comprises a stator 12 and a moving element 13, connected to one another by means of springs 14 in such a way that the moving element 13 may translate parallel to the first axis X, whereas it is basically fixed with respect to the second axis Y and the third axis Z (in FIG. 2, the third axis Z is orthogonal to the plane of the sheet).

The stator 12 and the moving element 13 are provided with a plurality of first and second stator electrodes 15', 15" and, respectively, with a plurality of mobile electrodes 16, which extend basically parallel to the plane Y-Z. Each mobile electrode 16 is comprised between two respective stator electrodes 15', 15", which it partially faces; consequently, each mobile electrode 16 forms with the two adjacent fixed electrodes 15', 15" a first capacitor and, respectively, a second capacitor with plane and parallel faces. Furthermore, all the first stator electrodes 15' are connected to a first stator terminal 20a and all the second stator electrodes 15" are connected to a second stator terminal 20b, while the mobile electrodes 16 are connected to ground. From the electrical standpoint, hence, the first inertial sensor 11 can be idealized by means of a first equivalent capacitor 18 and a second equivalent capacitor 19 (illustrated herein with a dashed line), having first terminals connected to the first stator terminal 20a and to the second stator terminal 20b, respectively, and second terminals connected to ground. Furthermore, the first and second equivalent capacitors 18, 19 have a variable capacitance correlated to the relative position of the moving element 13 with respect to the rotor 12; in particular, the capacitances of the equivalent capacitors 18, 19 at rest are equal and are unbalanced in the presence of an acceleration oriented according to the preferential detection axis (in this case, the first axis X).

Figure 3:
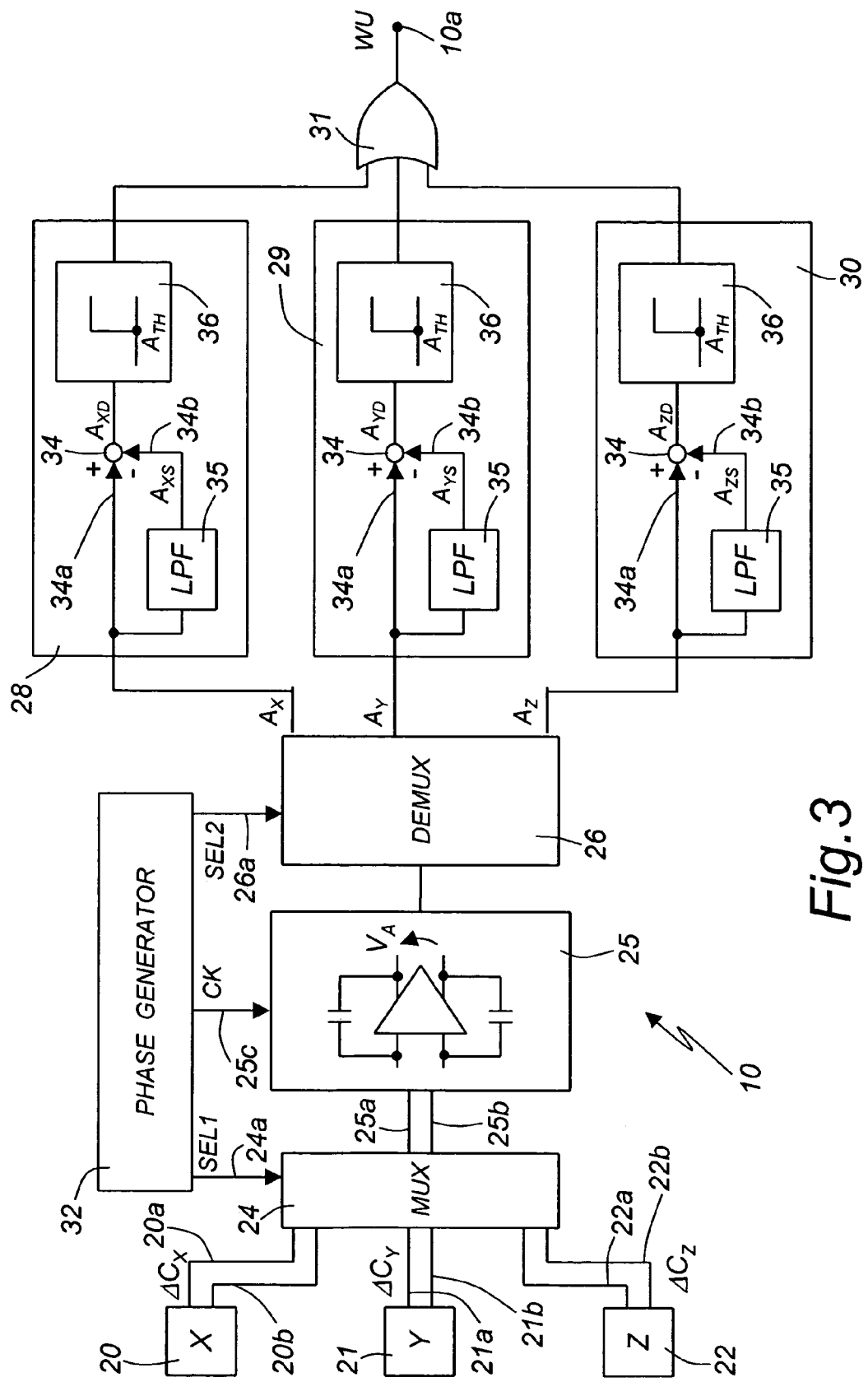
FIG. 3 is a schematic plan view of a detail of the device of FIG. 2.

With reference to FIG. 3, the activation device 10 comprises, in addition to the first inertial sensor 20, a second inertial sensor 21 and a third inertial sensor 22, identical to the first inertial sensor 20 and having preferential detection axes parallel to the second axis Y and to the third axis Z, respectively. Moreover, the activation device 10 comprises: a multiplexer 24; a capacitance-voltage (C-V) converter 25; a demultiplexer 26; a first detection line 28; a second detection line 29 and a third detection line 30, associated respectively to the first inertial sensor 20, to the second inertial sensor 21 and to the third inertial sensor 22; an output logic gate 31; and a phase generator 32.

First stator terminals 20a, 21a, 22a and second stator terminals 20b, 21b, 22b respectively of the first, second and third inertial sensors 20, 21, 22 are selectively connectable in sequence to detection inputs 25a, 25b of the C-V converter 25 via the multiplexer 24. For this purpose, a control input 24a of the multiplexer 24 is connected to a first output of the phase generator 32, which supplies a first selection signal SEL1.

The C-V converter 25 is based upon a differential charge-amplifier circuit, of a type in itself known, and has a timing input 25c, connected to a second output of the phase generator 32, which supplies timing signals CK, and an output 25d, which supplies, in sequence, sampled values of a first acceleration signal $A_X$, a second acceleration signal $A_Y$ and a third acceleration signal $A_Z$, correlated to the accelerations along the first, second and third axes X, Y, Z, respectively.

The demultiplexer 26 connects the output of the C-V converter 25 selectively and in sequence to respective inputs of the first, second and third detection lines 28, 29, 30, which thus receive respectively the first, second and third acceleration signals $A_X$, $A_Y$, $A_Z$. For this purpose, the demultiplexer 26 has a control input 26a connected to a second output of the phase generator 32, which supplies a second selection signal SEL2.

Each of the detection lines 28, 29, 30 comprises a subtractor node 34, a filter 35, of a low-pass type, and a threshold comparator 36. In greater detail, the input of each detection line 28, 29, 30 is directly connected to a non-inverting input 34a of the adder node 34 and is moreover connected to an inverting input 34b of the adder node 34 itself through the respective filter 35.

In practice, the filters 35 extract the d.c. components of the acceleration signals $A_X$, $A_Y$, $A_Z$ and supplies at output a first static-acceleration signal $A_{XS}$, a second static-acceleration signal $A_{YS}$ and a third static-acceleration signal $A_{ZS}$, respectively. The subtractor nodes 34 subtract the static-acceleration signals $A_{XS}$, $A_{YS}$, $A_{ZS}$ from the corresponding acceleration signals $A_X$, $A_Y$, $A_Z$. A first dynamic-acceleration signal $A_{XD}$, a second dynamic-acceleration signal $A_{YD}$ and a third dynamic-acceleration signal $A_{ZD}$, which are correlated exclusively to the accelerations due to variable forces, are thus provided on the outputs of the subtractor nodes 35 of the first, second and third detection lines 28, 29, 30, respectively.

The threshold comparators 36 have inputs connected to the outputs of the respective subtractor nodes 34 and outputs connected to the logic gate 31, which in the embodiment described is an OR gate. Furthermore, the output of the logic gate 31 forms the output 10a of the activation device 10 and supplies the activation pulses WU. In particular, an activation pulse WU is generated when at least one of the dynamic-acceleration signals $A_{XD}$, $A_{YD}$, $A_{ZD}$ is higher than a pre-determined threshold acceleration $A_{TH}$ stored in the threshold comparators 36; the activation pulses WU terminate when all the dynamic-acceleration signals $A_{XD}$, $A_{YD}$, $A_{ZD}$ return below the threshold acceleration $A_{TH}$. The threshold acceleration $A_{TH}$ is moreover programmable and is preferably so selected as to be exceeded in the presence of the stresses that the user impresses on the apparatus 1 during normal use.

In practice, the C-V converter 25 reads the capacitive unbalancing values $\Delta C_X$, $\Delta C_Y$, $\Delta C_Z$ of the inertial sensors 20, 21, 22, to which it is sequentially connected and converts the capacitive unbalancing values $\Delta C_X$, $\Delta C_Y$, $\Delta C_Z$ into a voltage signal $V_A$, which is then sampled. The first, second and third acceleration signals $A_X$, $A_Y$, $A_Z$ hence comprise respective sequences of sampled values of the voltage signal $V_A$ generated when the C-V converter 25 is connected respectively to the first, the second and the third inertial sensor 20, 21, 22; moreover, the first, second and third acceleration signal $A_X$, $A_Y$, $A_Z$ indicate the sum of all the accelerations that act respectively along the first, second and third axes X, Y, Z.

The static-acceleration signals $A_{XS}$, $A_{YS}$, $A_{ZS}$ supplied by the filters 35, which basically correspond to the d.c. components of the acceleration signals $A_X$, $A_Y$, $A_Z$, are correlated to the accelerations due to constant forces, such as for example the force of gravity. Note that, since the apparatus 1 can be variously oriented both during use and when it is not in use, not necessarily are the components of the force of gravity along the axes X, Y, Z always constant and they may be non-zero even when the apparatus 1 is not moved. However, as long as the apparatus 1 remains at rest, the force of gravity supplies constant contributions to the acceleration signals $A_X$, $A_Y$, $A_Z$. The static-acceleration signals $A_{XS}$, $A_{YS}$, $A_{ZS}$ take into account also all the causes that can determine, in the inertial sensors 20, 21, 22, a permanent displacement of the moving element 13 from the position of rest with respect to the stator 12 (FIG. 2). Amongst these causes, for example, there are fabrication offsets and deviations that can be caused by the fatiguing of the materials, especially in the springs 14. Subtraction of the static-acceleration signals $A_{XS}$, $A_{YS}$, $A_{ZS}$ from the acceleration signals $A_X$, $A_Y$, $A_Z$ advantageously enables compensation of said offsets.

The dynamic-acceleration signals $A_{XD}$, $A_{YD}$, $A_{ZD}$ are exclusively correlated to the accelerations due to variable forces and, in practice, are different from zero only when the apparatus 1 is moved, i.e., when it is picked up to be used. Consequently, at the precise moment when the user picks up the apparatus 1, at least one of the dynamic-acceleration signals $A_{XD}$, $A_{YD}$, $A_{ZD}$ exceeds the threshold acceleration $A_{TH}$ of the respective threshold comparator 36, and an activation pulse WU is supplied, which brings the control unit 3, the memory 4, the I/O unit 5 and the screen 6 back into the active state. Note that, in this case, also the force of gravity can advantageously provide a contribution to the dynamic-acceleration signals $A_{XD}$, $A_{YD}$, $A_{ZD}$, as far as the apparatus 1 can be rotated by the user so as to change the orientation of the axes X, Y, Z with respect to the vertical direction (i.e., with respect to the direction of the force of gravity). Consequently, the movement due to the intervention of the user is more readily detected.

Some advantages of the invention are evident from the foregoing description. In the first place, the activation device 10 enables the apparatus 1 to be brought back automatically into the active state from the stand-by state, since it is based just upon the forces that are transmitted by the user when he picks up the apparatus 1 to use it. In practice, the activation device 10 is able to distinguish a condition of use from a condition of rest by simply detecting a state of motion from a state of substantial rest. Consequently, the apparatus 1 is reactivated as soon as it is picked up by the user and the transients of exit from the stand-by state are exhausted when the user is terminating the movement of picking up the apparatus 1. The troublesome delays, that can reduce or eliminate the advantages deriving from the use of portable apparatus with stand-alone supply, are thus prevented. Furthermore, the use of inertial sensors of the MEMS type, which are extremely sensitive, have small overall dimensions and can be made at relatively low costs, is advantageous. Above all, however, the MEMS sensors have a virtually negligible consumption: consequently, the energy accumulated in the batteries is almost entirely available for active use of the apparatus 1, the effective autonomy whereof is significantly increased.

Finally, it is clear that modifications and variations can be made to the device described herein, without thereby departing from the scope of the present invention. In particular, the activation device 10 could comprise two inertial sensors (for example, in the case of a radio frequency mouse, which in use is displaced just in one plane) or even just one inertial sensor;

inertial sensors of a different type could also be used, for example rotational inertial sensors or else inertial sensors with more than one degree of freedom (i.e., having at least two preferential non-parallel detection axes). Furthermore, there can be provided a C-V converter for each inertial sensor used; in this case, use of the multiplexer and demultiplexer is not required.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A device for automatic detection of states of motion and rest, comprising:
   a first inertial sensor having a first preferential detection axis;
   a converter coupled to said first inertial sensor and supplying a first signal correlated to forces acting on said first inertial sensor according to said first preferential detection axis;
   a first processing stage structured to process said first signal and supply a second signal correlated to a dynamic component of said first signal wherein said first processing stage comprises a filter, supplying a third signal correlated to a static component of said first signal, and a subtractor element, for subtracting said third signal from said first signal; and
   a first threshold comparator supplying a pulse when said second signal exceeds a threshold.

2. The device according to claim 1 wherein said first inertial sensor is a micro-electro-mechanical sensor with capacitive unbalancing.

3. The device according to claim 1, further comprising a second inertial sensor having a second preferential detection axis, the first and second inertial sensors being of a micro-electro-mechanical type with capacitive unbalancing, the first preferential detection axis and the second preferential detection axis being orthogonal to one another.

4. The device according to claim 3 said first inertial sensor and said second inertial sensor are selectively connectable in sequence to said converter.

5. The device according to claim 4, comprising a third inertial sensor of a micro-electro-mechanical type with capacitive unbalancing, having a third preferential detection axis, orthogonal to said first preferential detection axis and to said second preferential detection axis.

6. The device according to claim 5, further comprising a switch device positioned to selectively connect said first inertial sensor, said second inertial sensor and said third inertial sensor in sequence to said converter.

7. The device according to claim 1, further comprising a second inertial sensor having a second preferential detection axis that is transverse to the first preferential detection axis.

8. The device according to claim 7, further comprising:
a multiplexer connected between the inertial sensors and the converter to selectively electrically connect each of the inertial sensors to the converter, the converter supplying a third signal correlated to forces acting on said second inertial sensor according to said second preferential detection axis;
a second processing stage structured to process said third signal and supply a fourth signal correlated to a dynamic component of said third signal;
a second threshold comparator supplying a pulse when said fourth signal exceeds the threshold; and
a demultiplexer connected between the converter and the first and second processing stages to selectively supply the first and third signals to the first and second processing stages, respectively.

9. The device according to claim 8, further comprising:
a phase generator connected to the multiplexer, converter, and demultiplexer and structured to provide timing signals that coordinate operations of the multiplexer, converter, and demultiplexer.

10. A portable electronic apparatus, comprising:
a supply source;
a plurality of user devices alternatively connected to said supply source in a first operative state, and disconnected from said supply source in a second operative state;
deactivation means connected to said user devices for setting said user devices in said second operative state; and
activation means for setting the user devices in the first operative state, said activation means including:
a first inertial sensor having a preferential detection axis,
a converter coupled to said first inertial sensor and supplying a first signal correlated to forces acting on said first inertial sensor according to said preferential detection axis;
a first processing stage structured to process said first signal and supply a second signal correlated to a dynamic component of said first signal, and
a first threshold comparator supplying an activation pulse when said second signal exceeds a threshold.

11. An apparatus according to claim 10 wherein, in the presence of the activation pulse, said user devices are in said first operative state.

12. The apparatus according to claim 10 wherein said first processing stage comprises a filter, supplying a third signal correlated to a static component of said first signal, and a subtractor element, for subtracting said third signal from said first signal.

13. The apparatus according to claim 10 wherein said first inertial sensor is a micro-electro-mechanical sensor with capacitive unbalancing.

14. The apparatus according to claim 10, wherein said activation means further include a second inertial sensor having a second preferential detection axis, the first and second inertial sensors being of a micro-electro-mechanical type with capacitive unbalancing, the first preferential detection axis and the second preferential detection axis being orthogonal to one another.

15. The apparatus according to claim 14, wherein said activation means further include a third inertial sensor of a micro-electro-mechanical type with capacitive unbalancing, having a third preferential detection axis, orthogonal to said first preferential detection axis and to said second preferential detection axis.

16. The apparatus according to claim 10, wherein said activation means further include a second inertial sensor having a second preferential detection axis that is transverse to the first preferential detection axis.

17. The apparatus according to claim 16, wherein said activation means further include:
a multiplexer connected between the inertial sensors and the converter to selectively electrically connect each of the inertial sensors to the converter, the converter supplying a third signal correlated to forces acting on said second inertial sensor according to said second preferential detection axis;
a second processing stage structured to process said third signal and supply a fourth signal correlated to a dynamic component of said third signal;
a second threshold comparator supplying a pulse when said fourth signal exceeds the threshold; and
a demultiplexer connected between the converter and the first and second processing stages to selectively supply the first and third signals to the first and second processing stages, respectively.

18. The apparatus according to claim 10, wherein said activation means further include:
a phase generator connected to the multiplexer, converter, and demultiplexer and structured to provide timing signals that coordinate operations of the multiplexer, converter, and demultiplexer.

19. A method for automatic detection of motion of a portable electronic device, comprising:
sensing motion of the device along a first preferential detection axis;
supplying a first signal correlated to forces acting on the device according to the preferential detection axis;
processing the first signal and supplying a second signal correlated to a dynamic component of the first signal wherein the processing comprises filtering the first signal to create a third signal correlated to a static component of the first signal, and subtracting the third signal from the first signal to create the second signal; and
supplying an activation pulse when the second signal exceeds a first threshold.

20. The method of claim 19, further comprising
sensing motion of the device along a second preferential detection axis that is orthogonal to the first preferential detection axis;
supplying a third signal correlated to forces acting on the device according to the second preferential detection axis;
processing the third signal and supplying a fourth signal correlated to a dynamic component of the third signal; and
supplying the activation pulse when the fourth signal exceeds a second threshold.

21. The method of claim 19, further comprising:
receiving the activation pulse at an operation circuit of the device, the operation circuit being in a stand-by condition prior to receiving the activation pulse; and
activating the operation circuit into an active condition in response to receiving the activation pulse.

22. A device, comprising:
a first inertial sensor having a first preferential detection axis;
a converter coupled to the first inertial sensor and supplying a first signal correlated to forces acting on the first inertial sensor according to the first preferential detection axis;

a first processing stage structured to process the first signal and supply a second signal correlated to a dynamic component of the first signal;

a first threshold comparator supplying a pulse when the second signal exceeds a threshold;

a second inertial sensor having a second preferential detection axis that is transverse to the first preferential detection axis;

a multiplexer connected between the inertial sensors and the converter to selectively electrically connect each of the inertial sensors to the converter, the converter supplying a third signal correlated to forces acting on the second inertial sensor according to the second preferential detection axis;

a second processing stage structured to process the third signal and supply a fourth signal correlated to a dynamic component of the third signal;

a second threshold comparator supplying a pulse when the fourth signal exceeds the threshold; and a demultiplexer connected between the converter and the first and second processing stages to selectively supply the first and third signals to the first and second processing stages, respectively.

23. The device of claim 22, further comprising:

a phase generator connected to the multiplexer, converter, and demultiplexer and structured to provide timing signals that coordinate operations of the multiplexer, the converter, and the demultiplexer.

24. The device of claim 22 wherein the first inertial sensor is a micro-electro-mechanical sensor with capacitive unbalancing.

25. A method for automatic detection of motion of a portable electronic device, comprising:

sensing motion of the device along a first preferential detection axis;

supplying a first signal correlated to forces acting on the device according to the preferential detection axis;

processing the first signal and supplying a second signal correlated to a dynamic component of the first signal;

supplying an activation pulse when the second signal exceeds a first threshold;

sensing motion of the device along a second preferential detection axis that is orthogonal to the first preferential detection axis;

supplying a third signal correlated to forces acting on the device according to the second preferential detection axis;

processing the third signal and supplying a fourth signal correlated to a dynamic component of the third signal; and supplying the activation pulse when the fourth signal exceeds a second threshold.

26. The method of claim 25, further comprising:

sensing motion of the device along a third preferential detection axis that is orthogonal to the first preferential detection axis and the second preferential detection axis;

supplying a fifth signal correlated to forces acting on the device according to the third preferential detection axis;

processing the fifth signal and supplying a sixth signal correlated to a dynamic component of the fifth signal; and supplying the activation pulse when the sixth signal exceeds a third threshold.

27. A method for automatic detection of motion of a portable electronic device, comprising:

sensing motion of the device along a first preferential detection axis;

supplying a first signal correlated to forces acting on the device according to the preferential detection axis;

processing the first signal and supplying a second signal correlated to a dynamic component of the first signal;

supplying an activation pulse when the second signal exceeds a first threshold;

receiving the activation pulse at an operation circuit of the device, the operation circuit being in a stand-by condition prior to receiving the activation pulse; and activating the operation circuit into an active condition in response to receiving the activation pulse.

28. The method of claim 27, further comprising terminating the activation pulse in response to the second signal being lower than the first threshold.

* * * * *

UNITED STATES PATENT AND TRADEMARK OFFICE
CERTIFICATE OF CORRECTION

PATENT NO. : 7,409,291 B2  
APPLICATION NO. : 10/789240  
DATED : August 5, 2008  
INVENTOR(S) : Fabio Pasolini et al.

Page 1 of 1

It is certified that error appears in the above-identified patent and that said Letters Patent is hereby corrected as shown below:

<u>Title page, item [30]</u>  
Foreign Application Priority Data, should read  
-- Feb. 28, 2003...(IT)...TO2003A 000141 --

Signed and Sealed this

Twenty-first Day of October, 2008

JON W. DUDAS  
*Director of the United States Patent and Trademark Office*

(12) EX PARTE REEXAMINATION CERTIFICATE (9930th)
United States Patent
Pasolini et al.

(10) Number: US 7,409,291 C1
(45) Certificate Issued: Nov. 8, 2013

(54) DEVICE FOR AUTOMATIC DETECTION OF STATES OF MOTION AND REST, AND PORTABLE ELECTRONIC APPARATUS INCORPORATING IT

(75) Inventors: Fabio Pasolini, S. Martino Siccomario (IT); Ernesto Lasalandra, S. Donato Milanese (IT)

(73) Assignee: STMicroelectronics Inc., Coppell, TX (US)

Reexamination Request:
No. 90/012,779, Jan. 30, 2013

Reexamination Certificate for:
Patent No.: 7,409,291
Issued: Aug. 5, 2008
Appl. No.: 10/789,240
Filed: Feb. 26, 2004

Certificate of Correction issued Oct. 21, 2008

(30) Foreign Application Priority Data

Feb. 28, 2003 (IT) .............................. TO2003A0141

(51) Int. Cl.
*G01C 21/00* (2006.01)

(52) U.S. Cl.
USPC ............................. 701/220; 700/245; 74/5 R

(58) Field of Classification Search
None
See application file for complete search history.

(56) References Cited

To view the complete listing of prior art documents cited during the proceeding for Reexamination Control Number 90/012,779, please refer to the USPTO's public Patent Application Information Retrieval (PAIR) system under the Display References tab.

*Primary Examiner* — My Trang Nu Ton

(57) ABSTRACT

A device for automatic detection of states of motion and rest includes at least one inertial sensor, having at least one preferential detection axis, and a converter, which is coupled to the inertial sensor and supplies a first signal correlated to forces acting on the first inertial sensor according to the preferential detection axis; the device further includes at least one processing stage for processing the first signal, which supplies a second signal correlated to a dynamic component of the first signal, and at least one threshold comparator, which supplies a pulse when the second signal exceeds a pre-determined threshold.

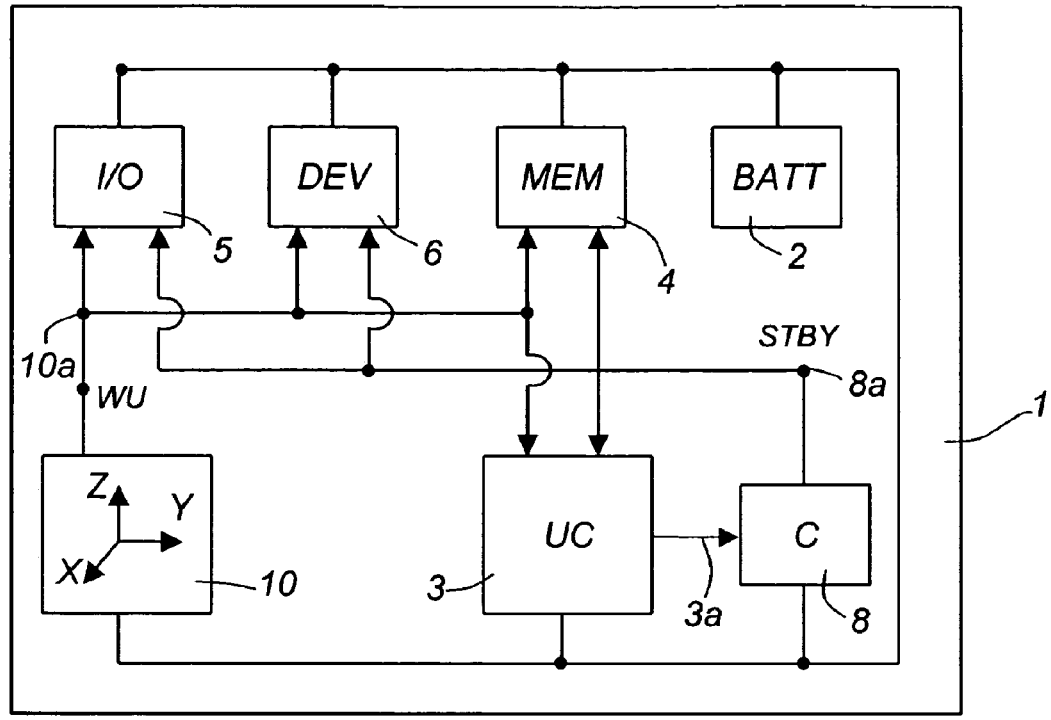

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 21, 27 and 28 is confirmed.

Claims 1-20 and 22-26 were not reexamined.

\* \* \* \* \*

(12) EX PARTE REEXAMINATION CERTIFICATE (10025th)
United States Patent
Pasolini et al.

(10) Number: US 7,409,291 C1
(45) Certificate Issued: Feb. 10, 2014

(54) DEVICE FOR AUTOMATIC DETECTION OF STATES OF MOTION AND REST, AND PORTABLE ELECTRONIC APPARATUS INCORPORATING IT

(75) Inventors: Fabio Pasolini, S. Martino Siccomario (IT); Ernesto Lasalandra, S. Donato Milanese (IT)

(73) Assignee: STMicroelectronics S.R.L., Agrate Brianza (IT)

Reexamination Request:
No. 90/012,500, Sep. 11, 2012

Reexamination Certificate for:
Patent No.: 7,409,291
Issued: Aug. 5, 2008
Appl. No.: 10/789,240
Filed: Feb. 26, 2004

Certificate of Correction issued Oct. 21, 2008

(51) Int. Cl.
*G01C 21/00* (2006.01)
(52) U.S. Cl.
USPC ............................. 701/220; 700/245; 74/5 R

(58) Field of Classification Search
None
See application file for complete search history.

(56) References Cited

To view the complete listing of prior art documents cited during the proceeding for Reexamination Control Number 90/012,500, please refer to the USPTO's public Patent Application Information Retrieval (PAIR) system under the Display References tab.

*Primary Examiner* — My Trang Nu Ton

(57) ABSTRACT

A device for automatic detection of states of motion and rest includes at least one inertial sensor, having at least one preferential detection axis, and a converter, which is coupled to the inertial sensor and supplies a first signal correlated to forces acting on the first inertial sensor according to the preferential detection axis; the device further includes at least one processing stage for processing the first signal, which supplies a second signal correlated to a dynamic component of the first signal, and at least one threshold comparator, which supplies a pulse when the second signal exceeds a pre-determined threshold.

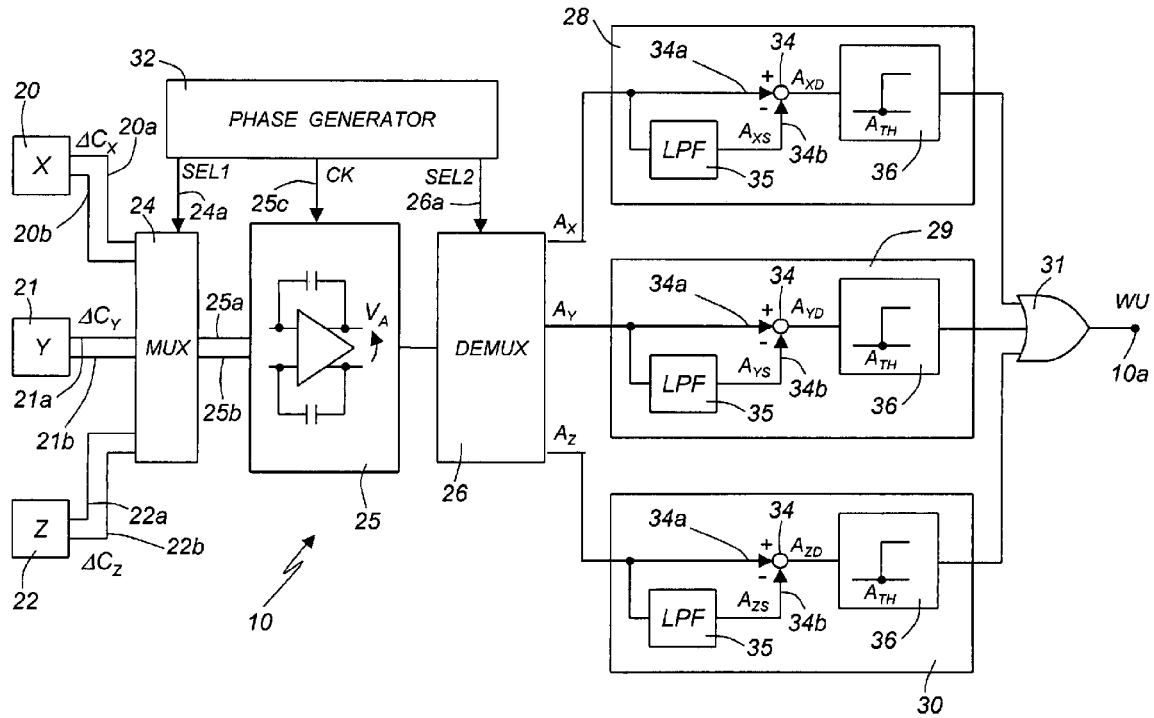

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-3, 7, 19-20 and 25-26 is confirmed.

New claims 29-35 are added and determined to be patentable.

Claims 4-6, 8-18, 21-24, 27 and 28 were not reexamined.

*29. The device according to claim 1, wherein said pulse is an activation pulse that places a portable electronic device into an active state that allows the device to be used by a user.*

*30. The device according to claim 1, wherein said dynamic component is correlated to user-initiated forces acting on a portable electronic device.*

*31. The device according to claim 30, wherein said dynamic component is correlated to forces transmitted by the user when the user picks up or moves the portable electronic device.*

*32. The device according to claim 30, wherein said first threshold is selected so as to be exceeded in the presence of forces that the user impresses on the portable electronic device during normal use of the device.*

*33. A method for automatically reactivating a portable electronic device by detecting motion of the portable electronic device, comprising:*

*sensing user-initiated motion of the device along a first preferential detection axis;*

*supplying a first signal correlated to forces acting on the device according to the preferential detection axis;*

*processing the first signal and supplying a second signal correlated to a dynamic component of the first signal wherein the processing comprises filtering the first signal to create a third signal correlated to a static component of the first signal, and subtracting the third signal from the first signal to create the second signal; and*

*supplying an activation pulse when the second signal exceeds a first threshold, wherein the activation pulse places the portable electronic device into an active state for use by a user.*

*34. The method according to claim 33, wherein said dynamic component is correlated to forces transmitted by the user when the user picks up or moves the portable electronic device.*

*35. The method according to claim 33, wherein said first threshold is selected so as to be exceeded in the presence of forces that the user impresses on the portable electronic device during normal use of the device.*

* * * * *